United States Patent [19]

Garman et al.

[11] Patent Number: 4,639,995
[45] Date of Patent: Feb. 3, 1987

[54] METHOD OF RETAINING AND REPAIRING A TRACK JOINT

[75] Inventors: James A. Garman, Eureka; Stephen D. Swift, Sparland, both of Ill.

[73] Assignee: Caterpillar Inc., Peoria, Ill.

[21] Appl. No.: 713,361

[22] Filed: Apr. 22, 1985

Related U.S. Application Data

[62] Division of Ser. No. 476,909, Mar. 18, 1983, abandoned.

[51] Int. Cl.⁴ .......................... B23P 7/00; B23P 19/00; B21D 1/00; B21D 39/00
[52] U.S. Cl. .............................. 29/402.08; 29/402.19; 29/509; 29/526 R
[58] Field of Search ........... 29/402.01, 402.08, 402.19, 29/509, 525, 526 R, 526 A, 434, 148.3; 16/274; 59/75; 474/202; 305/11, 12, 13, 14, 58 R, 58 PC, 59

[56] References Cited

U.S. PATENT DOCUMENTS

| | | | |
|---|---|---|---|
| 3,829,173 | 8/1974 | Stedman | 305/14 |
| 3,958,836 | 5/1976 | Brown et al. | 305/14 |
| 4,150,856 | 4/1979 | Hakkenberg et al. | 305/14 |
| 4,163,589 | 8/1979 | Fox et al. | 305/14 |

Primary Examiner—Mark Rosenbaum
Assistant Examiner—Irene Graves Golabi
Attorney, Agent, or Firm—O. Gordon Pence

[57] ABSTRACT

Apparatus (10) for retaining a joint (12) of an endless track (14) for a crawler-type vehicle is provided which includes a metal preform (64,66) which is pressed into a retainer cavity (60,62) surrounding and located at each of the ends of the joint (12) of the track (14). The cavities (60,62) are cooperatively formed by a pin groove (70) in the opposite end portions (40,42) of the pin (20) and a link socket (72) in the respective link outboard end portions (26,27) and which are disposed in registry with the pin grooves (70). Once intruded into the cavities (60,62), the formed-in-place retainers (64,66) thereby provided virtually eliminate any end play in the joint (12) during operation of the crawler vehicle.

13 Claims, 8 Drawing Figures

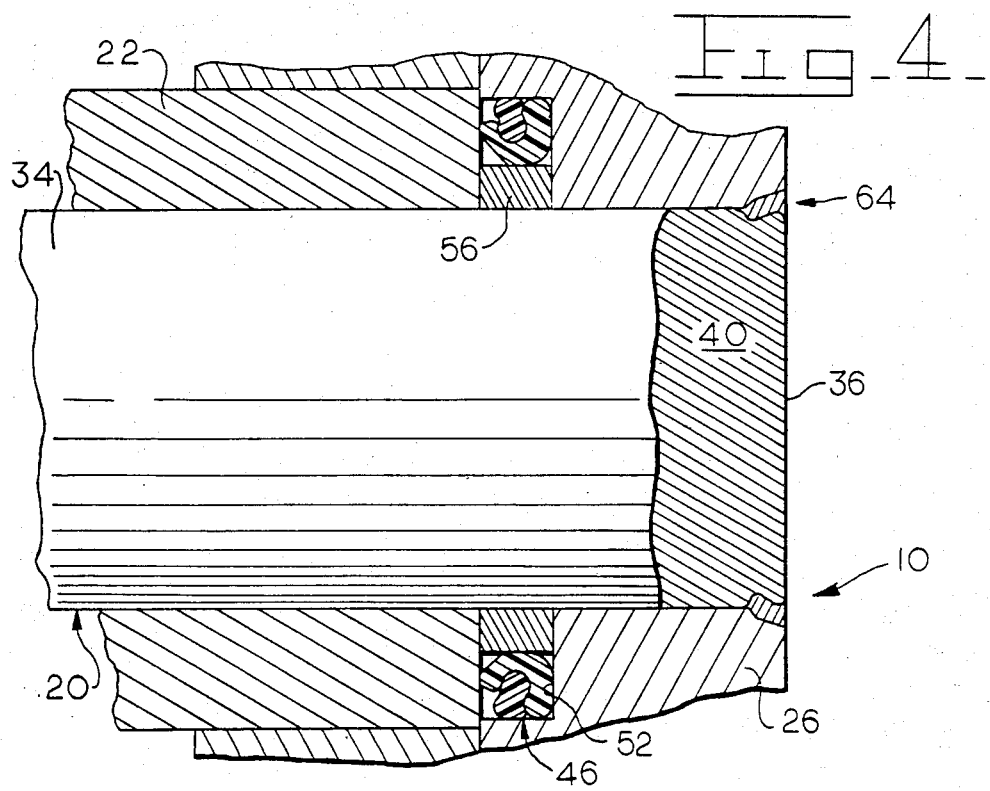
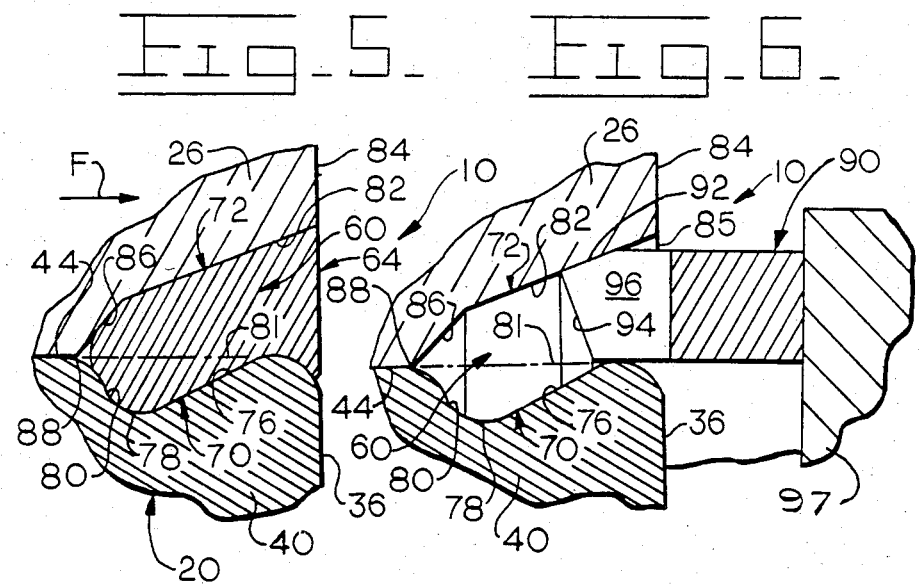

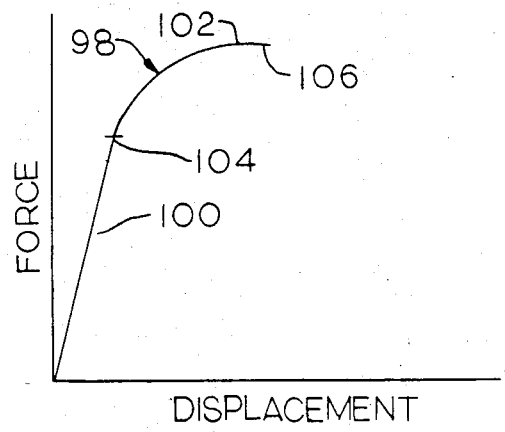
Fig_7_
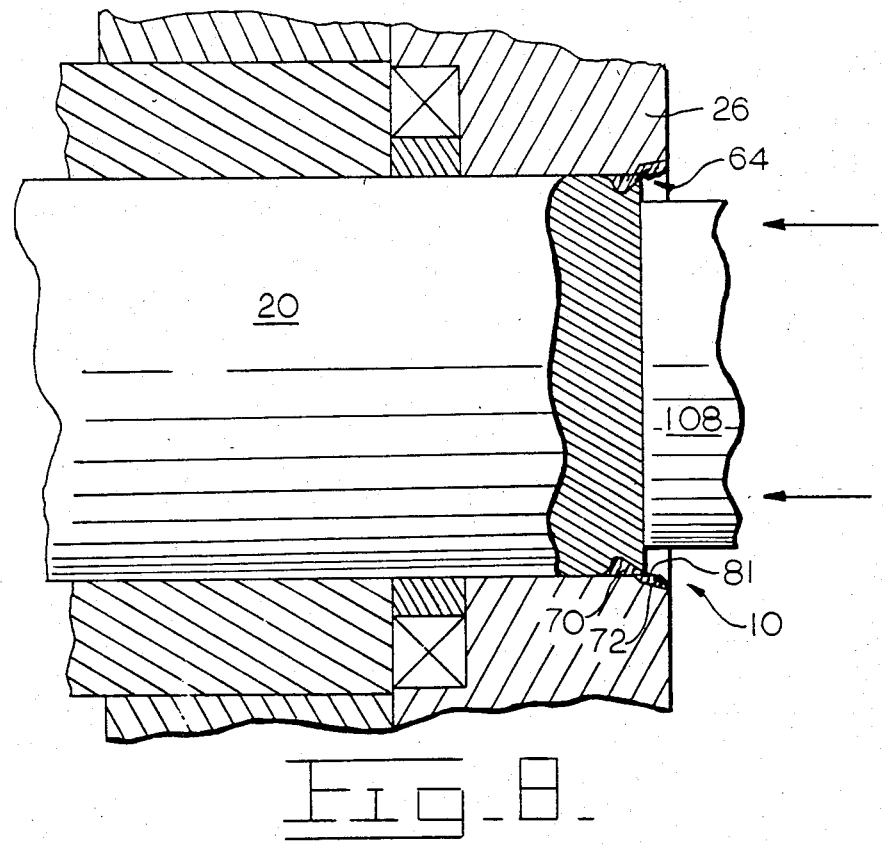
Fig_8_

METHOD OF RETAINING AND REPAIRING A TRACK JOINT

CROSS-REFERENCE TO RELATED APPLICATIONS

This is a division of application Ser. No. 476,909, filed Mar. 18, 1983, now abandoned.

DESCRIPTION

TECHNICAL FIELD

This invention relates generally to an endless track for crawler-type vehicles and more particularly to apparatus for retaining a joint of such track.

BACKGROUND ART

A track joint is customarily held together by an interference fit between the ends of the track pins and their respective link bores into which the pin ends are received. While a substantial force, sometimes exceeding 60 tons (54.4 metric tons), is typically used to press the links onto their respective pin ends, the links still have a tendency to move outwardly on the pin as a result of forces exerted on the track during operation of the vehicle.

Until recently, the amount of end play which developed in operation was normally within acceptable limits. However, with the introduction of larger crawler vehicles and engines with greater horsepower, even for smaller vehicles, the amount of end play has increased so as to become a concern, especially for sealed and lubricated track. In sealed and lubricated track, excessive end play can lead to a loss of the lubricant and the ingress of abrasive materials which can lead to excessive wear and premature failure of the track.

Various methods have been employed to limit the amount of end play in track joints. Keeper assemblies, such as those disclosed in U.S. Pat. No. 4,182,578 issued on Jan. 8, 1980 and U.S. Pat. No. 4,288,172 issued on Sept. 8, 1981, both to Richard E. Livesay et al, and both assigned to the assignee hereof, have been successfully employed to reduce such end play movement. In order to accommodate manufacturing tolerances, joints utilizing such keepers must have a certain amount of clearance which produces a limited amount of built-in end play. As a result, these keepers reduce, but do not completely eliminate, end play.

Another method of limiting end play is disclosed in U.S. Pat. No. 3,831,257 issued to Roger L. Boggs et al. on Aug. 27, 1974, which patent is also assigned to the assignee hereof, wherein welding about the ends of the track pins is employed. In this method, retention is quite dependent on the strength of the weld. In practice, weld strength is difficult to control with any degree of consistency. If a weld is so weak that it breaks, all of its retention ability is lost.

In U.S. Pat. No. 1,507,757 issued to Edwin H. Savage on Sept. 8, 1924, a soft metal key is driven through an opening in a rail and shoe of a track unit and into an angled pin groove to provide a locking device for securing the pin with the track unit.

DISCLOSURE OF THE INVENTION

In accordance with one aspect of the present invention, a method of retaining a link on a pin of a track joint for an endless track of a crawler-type vehicle is provided in which the link has a bore and an axially outwardly opening socket at one end of the bore, and the pin is positioned within the bore and has a circumferential groove thereabout disposed in registry with the socket, such method comprising the steps of: positioning an annular metal preform adjacent the outwardly opening socket; and applying an axial force to the preform sufficient to intrusively deform the preform into the groove of the pin and to permanently transform the preform into a formed-in-place retainer between the pin and link.

In another aspect of the present invention, a method of repairing an endless track of a crawler type vehicle is provided, the joint having at least one cavity and a formed-in-place retainer in the cavity, the cavity being defined by a groove in an end portion of a pin and a cooperating socket in a link end portion surrounding the pin end portion and having an opening at an outer side of the link end portion, comprising the steps of: pushing the pin out of the link end portion and shearing the formed-in-place retainer; removing the sheared retainer from the joint; replacing the pin end portion into the link end portion; positioning an annular metal preform adjacent the cavity opening; and applying an axial force to the preform sufficient to intrusively deform said preform and to permanently transform the preform into a new formed-in-place retainer.

BRIEF DESCRIPTION OF THE DRAWINGS

FIG. 4 is an enlarged sectional view of one end of the joint illustrated in FIG. 1;

FIG. 5 is a greatly enlarged fragmentary sectional view of the apparatus shown in FIG. 1;

FIG. 6 is a view similar to FIG. 5, but illustrating a preform as it would appear entering the retainer cavity before deformation;

FIG. 7 is a force/displacement curve of a preferred embodiment of the formed-in-place retainer; and, FIG. 8 is an enlarged sectional view similar to FIG. 4, but illustrating the formed-in-place retainer as it would appear when being sheared in response to removing the pin.

BEST MODE FOR CARRYING OUT THE INVENTION

Figure 1:
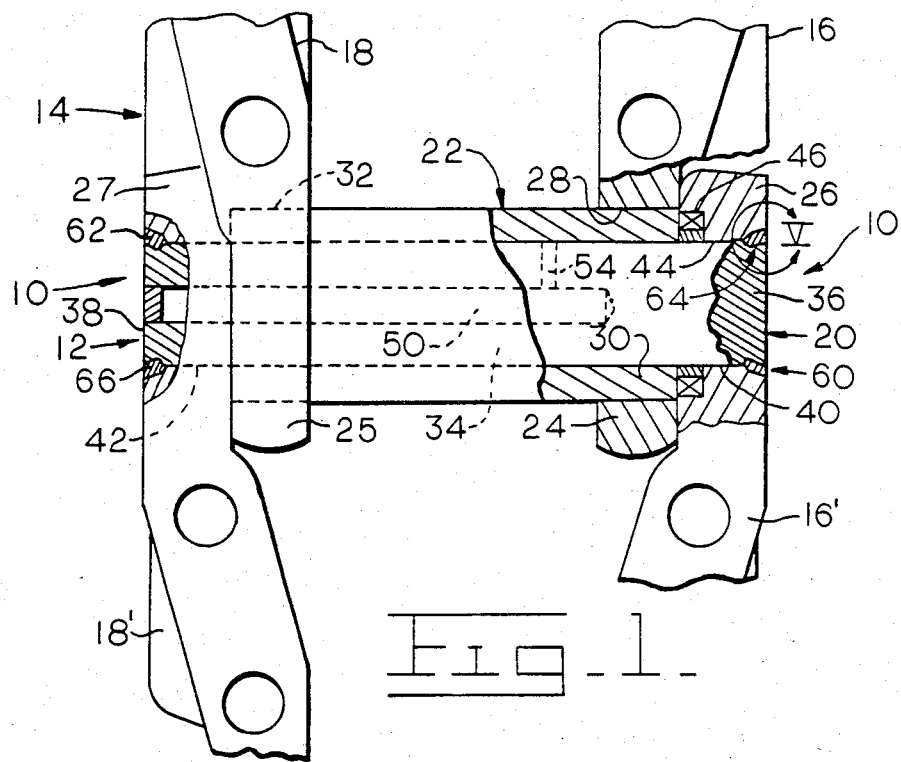
FIG. 1 is a fragmentary plan view of an endless track with a portion of a joint thereof in section illustrating an embodiment of the retaining apparatus.

Referring more particularly to FIG. 1 of the drawings, apparatus embodying the principals of the present invention is generally depicted at 10 for rigidly retaining a joint 12 of an endless track 14 of the type used on a crawler-type vehicle, not shown. The endless track 14 is generally of a conventional design, the major components of which include a plurality of right-hand links 16, 16' and left-hand links 18, 18', pins 20 and hollow bushings 22. Each right-hand link 16, 16' and left-hand link 18, 18' has an inboard end portion 24, 25, and an opposite outboard end portion 26, 27, respectively. The inboard end portions 24, 25 each have a bore 28 of a size sufficient to enable the inboard end portions to be press fitted onto the ends 30, 32 of the bushing 22. The pins 20 have a mid-portion 34, opposite ends 36 and 38 and opposite end portions 40 and 42. The pin mid-portion 34 is of a size to be received within the hollow bushing 22 and freely pivot relative to the bushing.

The outboard end portions 26, 27 of the links 16', 18' each have a bore 44. Each bore 44 is of a size sufficient to enable the outboard end links portions 26, 27 to be press fitted onto the opposite end portions 40, 42 of the pin 20.

The above assemblage is successively repeated with the next adjoining links, pins and bushings to complete the construction of the endless track.

While not intended to be so limited, the embodiment of the present invention to be hereinafter described is particularly well suited for use in an endless track which is sealed and lubricated. A track of this configuration normally has each joint provided with a pair of seals, one of which is shown at 46, and a lubricant reservoir, such as a sealed bore 50 in the pin 20. As best shown in FIG. 4, each seal 46 is disposed within a counterbore 52 in each link outboard end portion 26 and 27. Lubricant in the reservoir 50 is communicated to the pivoting interface between the bushing 22 and the mid-portion 34 of the pin 20 by a cross hole 54 in the pin 20, as best shown in FIG. 1. A thrust ring 56 is disposed in each of the counterbores 52 so that all of the joint components can be pushed together into abutment without crushing the seals 46. In other words, the outboard link end portions 26 and 27 are in close abutting contact with adjacent ends of the thrust rings 56. The other ends of the thrust rings abut the adjacent opposite end of the bushing 22. As a consequence, there is essentially no end play in the joint 12 after the assemblage is completed.

The apparatus 10 is principally directed toward maintaining the above-described abutting relationship during operation of the crawler-type vehicle. The apparatus 10 includes a pair of retainer cavities 60 and 62, each cavity being of a shape and orientation to receive and deform a respective one of a pair of formed-in-place retainer 64 and 66.

As both cavities 60, 62 are mirror images of each other, only cavity 60 will be hereinafter described in detail with particular reference to FIGS. 4 through 6, it being understood that such description applies to cavity 62.

Cavity 60 is defined by a pin groove 70 and a link socket 72. Groove 70 is formed in its respective pin end portion 40 and extends around at least a portion of the circumference of such end portion. While it should be understood that the groove 70 need be only partially or in segments about the circumference of the pin, it is preferable that it be continuous or annular to avoid the waste of time, labor and equipment in machining the part.

The groove 70 is disposed a preselected distance from the adjacent pin end 36. Such distance is related to the physical properties of the pin and is sufficient to provide the portion of the pin between its end 36 and the groove 70 with strength greater than that of the retainer 64. Maintaining this relative strength relationship functions to prevent damage or breakage of the pin during disassembly of the joint.

Referring to FIG. 5, the groove 70 preferably has a frustoconical surface 76, a bottom extremity 78 and a curvilinear side wall 80. The curvilinear side wall 80 extends from the cylindrical surface of the pin end portion 40 to the bottom extremity 78. The frustoconical surface 76 joins the curvilinear surface 80 adjacent the bottom extremity 78 and extends radially outwardly toward its peripheral edge adjacent the pin end 36. The frustoconical surface 76 is at an angle within a range of from between 20 to 30 degrees from its central axis, and preferably at an angle of approximately 25 degrees. The above configuration facilitates the substantially complete filling of the groove 70 by the retainer 64.

The socket 72 is formed in the link outboard end portion 26. The socket 72 is disposed in registry along an imaginary interface 81 with pin groove 70 when link outboard end portion 26 is in its installed position on the pin end portion 40. The socket 72 can be of other configurations depending on various criteria, such as material hardness and configuration of the retainer preform. Preferably, however, the socket 72 has at least a first frustoconical surface 82. This first frustoconical surface 82 is disposed in a spaced concentric relationship to the groove frustoconical surface 76 and extends radially inwardly from an outer side 84 of the link outboard end portion 26 toward the link bore 44. The cavity 60 has an annular opening 85 on the outer side 84. The first frustoconical surface 82 is preferably disposed at a second angle which is less than the angle of the groove frustoconical surface 76. This second angle is preferably within a range of 15 to 35 degrees, with an angle of about 20 degrees being preferable. Providing the first frustoconical surface 82 with an angle less than the angle of the groove frustoconical surface 76 advantageously produces a wedging action on the retainer 64 which facilitates the loading of the retainer in shear on application of an axial force F, as shown in FIG. 5.

The socket 72 preferably includes a second frustoconical surface 66 extending from the first frustoconical surface 82 to an inner peripheral edge 88 adjacent the link bore 44. The second frustoconical surface 86 is preferably at an angle of approximately 45 degrees which facilitates the intrusion of the retainer 64 into the groove 70.

Figures 2, 3:
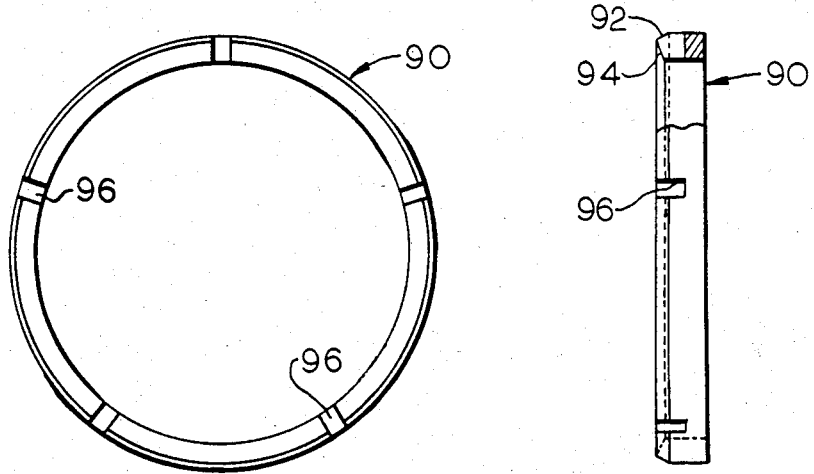
FIG. 2 is a frontal view of a preferred embodiment of the preform.
FIG. 3 is a side view of the preform of FIG. 2.

Prior to being deformed, the formed-in-place retainers 64, 66 are each identified as a preform 90, as shown in FIGS. 2, 3, and 6. While the preform 90 is herein disclosed as being a continuous ring, split or segmented rings are intended to be included within the scope of the present invention. It should also be understood that the preform 90 may take over configurations with the following description being exemplary of the preferred configuration.

As best shown in FIGS. 3 and 6, the preform 90 has a generally rectangular cross-sectional configuration provided with a lead-in chamfer 92 about the periphery of one end thereof and a beveled face 94 on such end. The lead-in chamfer is preferably at the same angle as the first frustoconical surface 82 of the socket 72. The beveled face 94 is preferably at an angle such that it is parallel to the side wall 80 of the groove upon intrusion of the preform into the cavity 60 to facilitate filling of the groove 70.

As best shown in FIGS. 2 and 3, the preform 90 is preferably provided with a plurality of radially oriented slots 96. The slots 96 extend a preselected axial distance into the preform 90 from the beveled end face 94. This arrangement is advantageous during any required disassembly of the joint 12, as hereinafter described, and facilitates the intrusion of the preform 90 into the groove 70.

In order to provide sufficient strength and rigidity for use in the track joint 12, the preform 90 is a ferrous material having a modulus of elasticity in the range of 19 to 30 million psi (131,000 to 207,000 MPa). A preform 90 constructed from a wrought steel with a hardness in a range of from Rockwell B60 to C35 has been found to be preferred. It should be understood, however, that the hardness of the preform 90 must be less than the corresponding hardness of the materials of the link and pin forming the cavity 60.

A ferrous powdered metal material can be satisfactorily used for the preform 90. Such powdered metal preform 90 preferably has a minimum initial density of 6.8 grams per cubic centimeter. After installation, the powdered metal material preferably has a minimum density of 7.5 grams per centimeter. The hardness of the powdered metal preform 90 is preferably in a range of from Rockwell B40 to B100, with a preferred hardness of Rockwell B90.

Industrial Applicability

To construct an endless track 14, the links 16, 16' and 18, 18', pins 20 and bushings 22 are assembled in the manner described above. A preform 90 is thereafter placed adjacent the annular opening 85 of the cavity 60. A sufficient force, as by means of a press 97, is then applied to the preform 90 to ram the preform 90 into the cavity 60 resulting in the preform 90 being plastically deformed and intruded into its formed-in-place retainer shape substantially conforming to the shape of the cavity 60. A force in the range of 100,000 to 200,000 pounds (445 to 890 kN) is normally required, with a force of approximately 150,000 pounds (667 kN) being typical. Forces in this range ensures the substantially complete filling of the cavity 60 and the tight wedging of the retainer material against all of the surfaces of the cavity 60. More importantly, the retainer material is tightly compacted between reacting surfaces defined principally by the frustoconical surface 76 of the groove 70 and the second frustoconical surface 86 of the socket 72 which are disposed on opposite sides of the interface 81 between the groove 70 and socket 72 portions of the cavity 60. As a consequence, an axial force F, as shown in FIG. 5, acting on the link outboard end portion 26 is resisted through the shear properties of the formed-in-place retainer 64. Because of its high modulus of electricity, the retainer 64 is substantially rigid, thus preventing any significant outward axial movement of the outboard end portion 26 on the pin end portion 40. A second preform 90 is similarly pressed into its cavity 62 at the other end of the joint 12.

In an example assembly, an experimental test was run on a laboratory press of a retainer of the above-described configuration made from a ferrous powdered metal material and having a Rockwell B60 hardness. The shear area of about 1.5 square inches (9.68 CM$^2$) along the interface 98 was capable of withstanding a shear force in excess of 50,000 pounds (22,680 Kg) without plastic deformation occurring in the retainer. The powdered metal retainer had a modulus of elasticity of about 19 million psi (131,000 MPa) before deformation, and about 25 million psi (172,000 MPa) after deformation. This increrase in modulus of elasticity was in response to the increase in density resulting from the large deformation force applied during intrusion of the preform 90 into the cavity.

It should be noted that by varying the shear area, the shear force carrying capability of the retainer 64 can be varied. Hence, the retainer 64 can be designed in accordance with the actual forces which will be experienced during operation of the various sizes of crawler vehicles. Shear force capability can thereby be maintained at a value greater than the operational forces. As a consequence, an endless track 14 constructed in accordance with the present invention will have joints 12 which have virtually no end play during operation of the crawler-type vehicle.

As noted above, the material of the retainer 64 has a high modulus of elasticity. This produces a force/displacement curve 98, as depicted in FIG. 7, having a steep sloped straight line portion 100 which is in the elastic range of this material and an abrupt curved portion 102 in its plastic range. By providing the retainer 64 with the preferred mechanical properties described above, the elastic limit 104 can be elevated. As a consequence, the retainer 64 is able to withstand a higher force without suffering plastic deformation and with very little deflection. Also, the difference in the force between the elastic limit 104 and the ultimate strength 106 of the material is reduced. It is desirable that the ultimate strength 106 be no more than 25% greater than the elastic limit 104. This is advantageous in that the retainer 64 can be designed to withstand operational forces approaching its elastic limit 104 without too great of an additional force being required to shear the retainer 64 for disassembly purposes. Thus, the force necessary to remove the pin 20 and simultaneously shear the retainer 64 is kept within the capacities of currently employed track presses. This eliminates waste and expenses in acquiring higher capacity track presses.

The retaining apparatus 10 of the present invention enables the track 14 to be disassembled for repair or replacement of worn components, such as the links 16, 18 or bushings 22, and then be reassembled. As depicted in FIG. 8, this is accomplished by means of a press 108 which pushes the pin 20 out of the link outboard end portions 26 and 27, while simultaneously shearing the formed-in-place retainers 64 and 66 along their respective interfaces 81. The sheared off portions of the retainers 64 and 66 are thereafter removed from their corresponding grooves 70 and sockets 72. Removal from the grooves 70 is facilitated by the slots 96, shown in FIGS. 2 & 3, which are preferably of a depth so as to extend past the interface 81. As a consequence, the portion of the preform 90 which had been intruded into the groove 70 becomes a plurality of pieces upon being sheared. Ordinarily, these pieces will simply fall out of the groove upon removal of the pin 20 from the joint 12. To rebuild the track 14, the track components are reassembled as they were initially and a new preform 90 is placed adjacent each of the openings 85 of the cavities 60 and 62. A force is applied to each of the preforms 90 to cause their intrusion into their respective cavities 60, 62 and deformation into new formed-in-place retainers 64 and 66.

After an extended period of operation of the track 14, a certain amount of end play can develop in the joint 12 due to internal wear between the axially abutting components of the joint 12. If this happens, the retainers 64 and 66 can advantageously be repressed to again eliminate this end play.

Other aspects, objects, and advantages of the present invention will become apparent from a study of the specification, drawings and the following appended claims.

I claim:

1. A method of repairing a joint of an endless track of a crawler type vehicle, said joint having at least one cavity and a formed-in-place retainer in said cavity, said cavity being defined by a groove in an end portion of a pin and a cooperating socket in a link end portion surrounding said pin end portion and having an opening at an outer side of said link end portion, comprising the steps of:
  pushing said pin out of said link end portion and shearing said formed-in-place retainer;
  removing the said sheared retainer from said joint;
  replacing said pin end portion into said link end portion;
  positioning an annular metal preform adjacent said cavity opening; and
  applying an axial force to the preform sufficient to intrusively deform said preform and to premanently transform the preform into a new formed-in-place retainer.

2. A method of retaining a link on a pin of a track joint for an endless track of a crawler-type vehicle, said link having a bore and an axially outwardly opening socket at one end of said bore, and said pin being positioned within said bore and having a circumferential groove thereabout disposed in registry with said socket, said method comprising the steps of:
  positioning an annular metal preform adjacent said outwardly opening socket; and
  applying an axial force to said preform sufficient to intrusively deform said preform into said groove of the pin and to permanently transform said preform into a formed-in-place retainer between said pin and link.

3. The method of claim 2 wherein said groove has a generally axially inwardly facing surface and said socket has a generally axially outwardly facing surface disposed in a spaced, concentric relationship to said groove surface, and wherein said retainer substantially conforms to said groove and socket between said surfaces.

4. A method of retaining a joint of an endless track for a crawler-type vehicle, said joint having a pair of inboard link end portions pressed onto the opposite ends of a hollow bushing of said joint, a pin received through said hollow bushing with opposite end portions thereof protruding from said bushing, and a pair of outboard link end portions each having a pin bore, said outboard link end portions being pressed onto a respective one of said opposite end portion of said pin end portions to render the pin and outboard link end portions pivotable relative to the bushing and inboard link end portions, said method comprising the steps of:
  providing each of said pin end portions with a circumferential groove, each groove having a generally axially inwardly facing surface;
  providing each of said link outboard end portions with a socket about the outboard end of its respective pin bore, each of said sockets having a generally axially outwardly facing surface and each socket being in registry with a respective one of said pin grooves, said respective sockets and grooves each defining a retainer cavity having an opening at the outer side of its respective link outboard end portion;
  positioning an annular metal preform adjacent each of said openings of said cavities; and
  applying an axial force to each of said preforms sufficient to ram said preforms into said cavities and to permanently transform each preform into a formed-in-place retainer, each retainer substantially filling its respective cavity between said outwardly facing socket surface and said inwardly facing groove surface for restraining outward axial movement of the link end portions on the pin during operation of the vehicle.

5. The method of claims 2 or 4, wherein the preform is made of a ferrous material having a modulus of elasticity in the range of 131,000 to 207,000 MPa.

6. The method of claim 5, wherein each preform is made of wrought steel having a hardness in the range Rockwell B60 to C35.

7. The method of claim 6, wherein the hardness is substantially Rockwell B90.

8. The method of claim 5, wherein the preform is made of a powdered ferrous metal having a minimum density of 6.8 grams per cubic centimeter.

9. The method of claim 8, wherein the powered metal has a minimum density of 7.5 grams per cubic centimeter after being rammed into the cavity and deformed.

10. The method of claim 8, wherein the preform has a hardness in the range of Rockwell B40 to B100.

11. The method of claim 10, wherein the hardness is substantially Rockwell B90.

12. The method of claim 5, wherein the preform is a ring having a plurality of generally radially oriented slots extending along part of its axial dimension from its inboard end.

13. The method of claim 12, wherein the preform has a substantially rectangular cross-sectional configuration, with a bevelled lead-in chamfer at its inboard end, the chamfer being disposed at an angle which is substantially equal to the angle of the axially outwardly facing surface at the entrance to the socket.

* * * * *